Aug. 15, 1972  J. J. GRABAUSKAS  3,684,732

PROCESS FOR PRODUCING A FORMABLE COLLAGEN DISPERSION

Original Filed Oct. 11, 1967  2 Sheets-Sheet 1

FIG. I.

INVENTOR
JOSEPH J. GRABAUSKAS

ATTORNEY

Aug. 15, 1972    J. J. GRABAUSKAS    3,684,732
PROCESS FOR PRODUCING A FORMABLE COLLAGEN DISPERSION
Original Filed Oct. 11, 1967    2 Sheets-Sheet 2

INVENTOR
JOSEPH J. GRABAUSKAS
ATTORNEY

United States Patent Office 3,684,732
Patented Aug. 15, 1972

3,684,732
PROCESS FOR PRODUCING A FORMABLE
COLLAGEN DISPERSION
Joseph J. Grabauskas, Chicago, Ill., assignor to
Union Carbide Corporation
Original application Oct. 11, 1967, Ser. No. 674,575.
Divided and this application Apr. 29, 1969, Ser. No.
851,508
Int. Cl. B01j 13/00
U.S. Cl. 252—311        8 Claims

ABSTRACT OF THE DISCLOSURE

An air-free collagen slurry can be mixed with an air-free swelling agent and the mixture can then be subjected to shearing action to obtain a uniformly swollen collagen dispersion from which collagen structures can be subsequently fabricated.

---

This application is a division of application Ser. No. 674,575, filed Oct. 11, 1967, now abandoned.

This invention relates to the mixing of a plurality of materials. More particularly, this invention relates to the homogeneous mixing of collagen with a liquid swelling agent to obtain a high solids concentration mass of uniformly swollen collagen.

The production of homogeneous mixtures is replete with problems. For example, in the preparation of collagen-liquid blends in which the amount of liquid present in the blend is less than that which the collagen is capable of imbibing, uniform distribution of the liquid with the collagen mass and, consequently, uniform swelling of the collagen is, at best, extremely difficult to attain. Generally, there is a tendency for the first portions of the collagen contacted by the liquid to rapidly imbibe to their capacity thus consuming the liquid before other portions of the collagen can be brought into contact with the liquid. The resultant collagen-liquid blend is characterized by a portion of the collagen containing essentially all of the swelling agent and another portion in which the collagen is in the form of lumps of unswollen collagen which are usually matted together and encapsulated by the viscous, swollen collagen. Subsequent homogenization of the blend is extremely difficult due to the high viscosity of the blend and the susceptibility of the collagen to be degraded by the local frictional heat produced by the high shear forces which are concomitant with mixing.

When collagen is extruded in the form of tubing, films, sheets, fibers, and the like, a high collagen concentration in the blends is desirable in order to provide rapid coagulation and/or drying. Processing of high solids concentration compositions by the methods presently in use generally require extensive mechanical processing, usually involve a recirculating system, and can result in degradation or denaturation to such an extent that the resultant products are not satisfactory. Use of low shear rates generally avoid the problem of local overheating and consequent degradation of the collagen in a highly viscous mass but tend to interfere with attaining homogeneity of and freedom from lumps in the blend which are desired for continuous extrusion of thin casings. In addition, the viscous, high-solids collagen blends are difficult to process without air entrapment. Entrapped air causes structural weaknesses and imperfections in the formed structures while the presence of lumps can interrupt the desired continuity of the desired article in the extrusion operation.

It is an object of the present invention, therefore, to provide a method and apparatus by which collagen can be homogeneously mixed with a swelling agent and obtain therefrom a uniformly swollen collagen blend having a high concentration of solids.

This and further objects of the present invention will become more apparent from the ensuing description.

It has now been found that the objects of this invention can be generally attained by delivering a relatively low viscosity, substantially air-free collagen suspension to a first zone; delivering a low viscosity, air-free swelling agent to a second zone; mixing said swelling agent and collagen in a mixing zone and immediately subjecting the mixed mass to a shearing action, continuing the shearing action while the mass is moved through the mixing zone and the collagen particles in the suspension become swollen; maintaining the swelling agent-collagen mixture in the form of a thin, sheet-like mass throughout the length of said mixing zone while maintaining the mixture in said mixing zone at a predetermined temperature; and extruding said mixture in the form of an endless, self-supporting structure.

To practice the present invention, a mixing apparatus, hereinafter referred to as a "homogenizer," can be employed which comprises, in combination, a housing, a rotor within said housing, a plurality of spaced inlets at one end of said housing and an outlet from said housing spaced from said inlets, said rotor having a plurality of small protuberances along a major portion of its length, the distance between the planar surface defined by said protuberances and the inside wall of said housing being such that a flow path is provided from each inlet to the end of and along the major portion of the length of said rotor.

The collagen suplied to the homogenizer can be prepared by any known method such as cleaning a collagen-containing tissue, as for example, tendon or fresh or limed animal hide, and then comminuting the collagen to the desired size.

The preliminary comminuting is preferably performed at a low temperature through the use of a coolant such as ice, and can be carried out by the use of any well known means such as in a conventional meat grinder.

The comminuted collagen can then be mixed with a liquid coolant such as water. The collagen does not imbibe the liquid to such an extent as to form a viscous blend unless a swelling agent is present. Thus, the collagen can be diluted with water to yield, for example, a 10 percent dry solids mixture which would be characterizable as a solid in liquid suspension rather than an extrudable or formable viscous composition. The terms "extrudable" or "formable composition" as used throughout this application and in the appended claims should be understood as and are intended to refer to the ability to process a mixture in conventional equipment, such as an extruder, and obtain therefrom a formed structure.

The collagen-liquid mixture is then subjected to a fibrillation operation by use of, for example, an apparatus normally used to prepare meat emulsions. The term "fibrillation" as employed herein refers to the act of subdividing the collagen into a suspension of fibrous particles in order to prepare it for swelling, the fibrous suspension containing sufficient liquid such that the solids content of the fibrous collagen suspension can be from about 3%–15% by weight or higher of the total composition.

The invention will become more clear when taken together with the accompanying drawing which is set forth as being exemplary and illustrative of the apparatus that can be employed as is not intended, in any way, to be limitative thereof and wherein.

Figure 1:
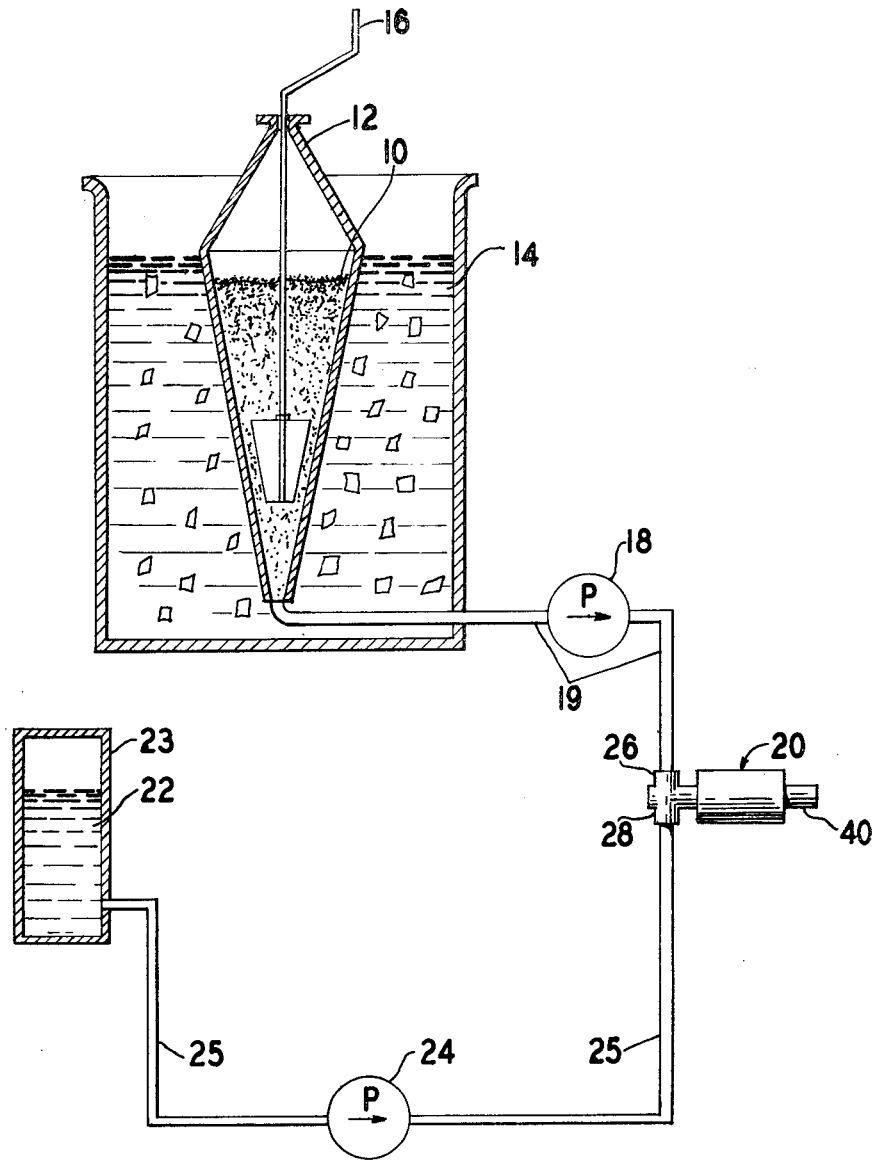
FIG. 1 is a diagrammatic illustration of one embodiment by which the invention can be practiced.

Turning now to the drawing, wherein like reference numerals denote like parts, there is shown in FIG. 1 one manner by which the prepared collagen, which is basically in the form of a slurry 10, is fed to a pressurized vessel 12, which can be cooled by any convenient means, such as an ice water bath 14.

The pressurized vessel 12 can be maintained under a pressure of from about 30 to 80 pounds per square inch (p.s.i.) through the use of compressed air, nitrogen or the like, which is supplied to an upper portion of the pressurized vessel 12.

A stirrer 16, can be employed in the pressurized vessel 12 to prevent any solids from settling out and to provide for the proper distribution of collagen. A conventional metering pump 18 delivers the collagan slurry 10, under pressure, through conduit 19 and inlet port 26 to a homogenizer, generally indicated by reference numeral 20.

For the preparation of formable collagen compositions having desired or required concentrations for use in producing sausage casing or other extrudable or formable structures, the collagen must be mixed with a swelling agent. Suitable swelling agents are those materials which will cause collagen to imbibe appreciable amounts of fluids over and above the normal moisture content of collagen when in contact with water.

Any of the known swelling agents such as dilute acids or dilute alkalis and salts can be used. Preferred for use as swelling agents are dilute solutions of hydrochloric, lactic and acetic acids and dilute solutions of sodium hydroxide.

A swelling agent solution 22 can be delivered, under pressure, from a suitable supply reservoir 23 to the homogenizer 20 through inlet port 28 by means of a second conventional metering pump 24 and conduit 25.

The flow rates of the swelling agent 22 and the collagen slurry 10 are metered by the pumps 24 and 18, respectively, and are maintained at a ratio so that, after mixing and swelling in the homogenizer 20, the collagen-swelling agent blend can be transferred therefrom through discharge outlet 40 to obtain an extrudable or formable composition of the desired or required solids content. Hence, although the rates at which the collagen slurry 10 and the swelling agent 22 are delivered to the homogenizer 20 are important, they will be dependent upon the concentrations of the collagen and swelling agent to be mixed which, in turn, will be dependent upon the final collagen composition desired or required to be obtained.

In the homogenizer 20, the swelling agent 22 and the collagen slurry 10 are blended and the collagen imbibes liquid (swells). The resultant, extrudable or formable composition can then be processed as desired to yield a formed product as, for example, leather-like fibrous materials such as are use for the production of shoes, filters such as are used for cigarettes, tubular casings such as those employed in producing sausages, filaments such as are used for sutures, and the like.

The mixing of the collagen and swelling agent, even under conditions of extensive processing with recirculation, can fail to provide the degree of homogeneity required for continuous extrusion of thin casings such as the type employed for producing sausage products. The structure and method of operation of the homogenizer 20, is therefore, of the ulmost criticality.

Figure 2:
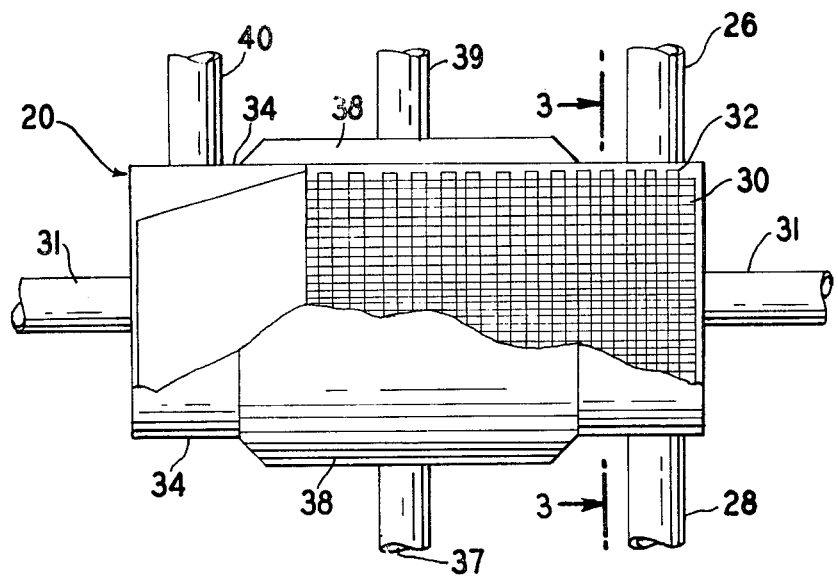
FIG. 2 is a side elevation view, part in section, of one embodiment of the homogenizer apparatus of the invention.
Figure 3:
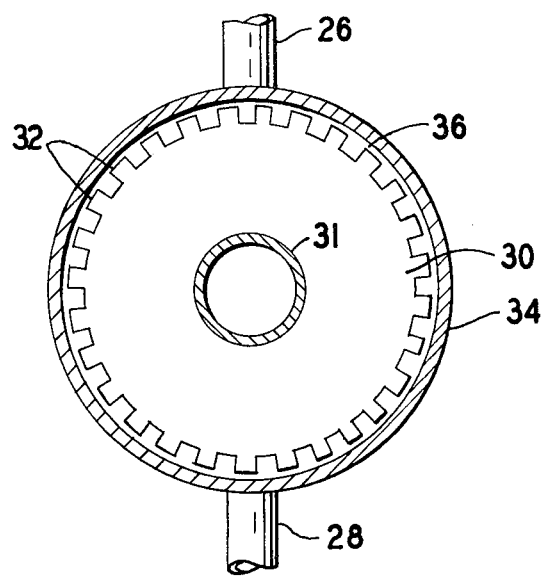
FIG. 3 is an exaggerated view of the apparatus of FIG. 2 taken through line 3—3 thereof.

One embodiment of an homogenizer 20 which can be utilized in the practice of the present invention is shown in more detail in FIGS. 2 and 3. As shown therein, the homogenizer 20 comprises a cylindrical rotor 30 rotatably mounted on shaft 31 which, in turn, is connected to a suitable drive means such as an electric motor (not shown). Surrounding rotor 30 is a cylindrical stator housing 34 having a smooth inner surface. A cooling jacket 38 equipped with inlet means 37 and outlet means 39, is provided about stator 34.

As can be seen more clearly in FIG. 3, rotor 30 is provided with a plurality of projections 32 on its outer circumferential surface. The configurations of the projections 32 on the outer circumferential surface of the rotor 30 and the smooth inner circumferential surface of the stator 34 are important to the extent that coaction between these surfaces must produce a gradual, continuous shredding of any lumps present in the collagen slurry and result in uniform homogenization of the slurry as it progresses axially from the inlet end at inlet ports 26, 28 to the discharge outlet 40 of the homogenizer.

The annular space between the inner surface of the stator 34 and the outer surface defined by the circumferential pläne formed by the upper surfaces of the projections 32 and identified by reference numeral 36, must be small enough to insure a high shear rate of the collagen slurry. It has been found that this distance 36 should be on the order of from about 0.005 to 0.015 of an inch and, advantageously, about 0.010 of an inch so that the collagen slurry can be mixed to obtain a correspondingly thin layer having a thickness of about the same dimensions. Preferably, the collagen slurry is in the form of a thin sheet-like mass as it is subjected to the shearing action in the homogenizer so that there is provided a maximum surface-to-volume ratio of the sheet-like mass. Under these conditions, proper and effective shearing is provided and results in obtaining a uniformly homogenized composition. The effective heat removal ability of the cooling jacket 38 is thusly also enhanced, thereby significantly decreasing or substantially eliminating any degradation since the slurry being cooled is spread thin.

It has also been found that the height of the projections 32 should be from about 0.03 of an inch to 0.09 of an inch to obtain adequate results. Preferably, the height of the projections should be about 0.03 of an inch. The projections can have various configurations such as rectangular, square, oval, hemispherical and the like, as desired or required. The projections 32 need not extend the full length of the rotor 30 and can vary in size or configuration along the length of the rotor. Preferably, however, projections 32 are provided along the entire length of the rotor 30.

Rotor 30 can be conveniently fabricated to be about 2.5 inches in diameter and about 4.5 inches in length to provide a system capable of handling a collagen slurry throughput on the order of about 2.5 kilograms/hour and in which the dwell time of the slurry is on the order of from about 30–40 seconds. Adequate homogenization of the collagen slurry can most readily be achieved while minimizing degradation through the expedient of increasing the lengths of the rotor 30 and the stator 34.

The embodiments of the apparatus of the present invention can be employed for a continuous, one-pass mixing of fibrillated collagen slurry with a liquid swelling agent.

With reference first to FIG. 1 of the drawing, a typical operation of the apparatus will now be described.

The pressurized vessel 12 is charged with the desired collagen slurry 10. An air pressure of from about 30 to 80 pounds per square inch (p.s.i.) can be employed in the pressure vessel 12 to force the collagen slurry 10, which can contain up to about 8.0% solids, to metering pump 18. Metering pump 18, in turn, delivers a metered quantity of the collagen slurry 10 under pressure through conduit 19 and inlet port 26 of the homogenizer 20. Similarly, the swelling agent 22, which is preferably a dilute aqueous acid, such as 1.54% to 2.24% lactic acid solution, is supplied under pressure through conduit 25 to the homogenizer 20 by pump 24.

The ratio of the acid to collagen and the acid pH are adjusted to obtain a collagen-swelling agent blend having a pH of about 4.0. By regulating the relative speeds of metering pumps 18 and 24 sufficient pressure and an efficient flow rate control of the blend through the homogenizer can be provided as desired or required.

The swelling agent solution 22 can be cooled to as low a temperature as practical prior to its being pumped to the homogenizer 20. The low temperature of the swelling agent 22 helps to retain a low temperature in the resultant collagen-swelling agent blend during the subsequent mixing and shearing operation in the homogenizer 20 and thus helps to avoid collagen degradation. However, it is important that the temperature of the swelling agent be sufficiently high to avoid its freezing or freezing of the collagen slurry, or otherwise interfere with the ability of the collagen to imbibe liquid.

The collagen slurry 10 and swelling agent 22 enter through inlet ports 26 and 28, respectively (FIGS. 2 and 3). A low acid inlet is preferred to facilitate air purging when the homogenizer is initially filled with acid.

In the practice of the present invention, separate, spaced inlets are required for the collagen slurry and for the swelling agent. However, additional additives, whose use is known to those skilled in the art, can also be premixed with either the swelling agent or collagen slurry or can be fed separately to the homogenizer through an additional inlet or a plurality of inlets. Exemplary of these additives are such ingredients as dyes, pigments, diluents, pore formers, blowing agents, flavoring agents, hardening agents and the like, as well as shrink control agents typified by such materials as synthetic fibers such as cellulose, cotton and rayon; or such materials as alginates, starches, and the like.

The use of a plurality of inlets for each ingredient or component as, for example, in a system in which every other inlet of a series of radially displaced inlets is connected to the collagen slurry supply and the remaining inlets are connected to the swelling agent supply, has the advantage of providing a larger degree initial mixing.

A liquid coolant, such as silicone oil, alcohol, glycol and the like, can be circulated through cooling jacket 38 at a temperature sufficiently low to prevent the discharge temperature from the homogenizer 20 from rising above 20° C. and, preferably not above 15° C., but high enough so that the collagen slurry and swelling agent do not freeze.

The optimum speed of rotation of the rotor 30, will be somewhat dependent upon the throughput, viscosity, rotor design and clearances between the planar surfaces of the rotor 30 and the stator 34 as well as the operating temperatures. The speed at which the rotor 30 is driven should be such as to maintain a product discharge temperature at outlet 40 below about 20° C., and preferably below 15° C. in order to avoid collagen degradation.

It is preferred that all process steps such as swelling, dispersing, extrusion or forming of the collagen be conducted at temperatures not to exceed about 15° C. in order to minimize degradation.

The collagen supplied to the homogenizer can be prepared in various manners. The following examples of collagen preparation and pretreatment procedures are illustrative of the various possible procedures which can be employed and are not intended to indicate the limits of the invention. Parts and percentages are by weight, unless otherwise indicated.

EXAMPLE I

Nonbifurcated, deep flexor, bovine tendons were manually cleaned and scraped to remove adhering refuse such as tendon sheath, fat, hair and the like. Twenty-four hundred grams (gms.) of the cleaned tendon was then mixed with 2300 gms. of crushed ice and ground in a conventional meat grinder. A plate with ⅜ inch holes was used for the first pass through the grinder and a plate with ⅛ inch holes was used for the second pass. The temperature as measured with a glass thermometer inserted into the mass was 0° C. The mixture had the appearance of white, coarsely ground meat.

Twenty-three hundred grams of water was added to the ground collagen by manual mixing. The mixture was then passed four times through a meat emulsifier pre-cooled to about 5° C. with ice, characterized in that it was driven by a 28 horsepower motor, had a superfine plate having holes 1.7 millimeters (mm.) in diameter and a high speed cutting head. The meat emulsifier was cooled to offset the heat generated by mechanical action and to maintain the temperature of the collagen mass at no greater than 15° C. The emulsified collagen mass had the consistency of uncooked sausage emulsion.

The resultant fibrillated collagen showed, under microscopic examination, a shrink temperature essentially identical to that of tendom (66–68° C.) which indicated there had been no substantial degradation. The term "shrink temperature" refers to the temperature at which the collagen fibers, in contact with water, contract to about one-third to one-quarter of their initial length.

The resultant fibrillated collagen was then ready for mixing with a swelling agent.

EXAMPLE II

The process of Example I was followed, except that beef hide, from which the hair layer and flesh-side impurities had been removed, was substituted for the beef tendon.

MIXING PROCEDURES

EXAMPLE III

The fibrillated hide of Example II was diluted with water to form a suspension having a 4.72% solids content. This slurry was maintained under a pressure of 60 p.s.i. in a pressurized vessel which was cooled to 0° C. with an ice water bath.

The aqueous collagen slurry was then pumped at a rate of 395 cc./min. to the upper inlet of a homogenizer of the type shown in FIGS. 2 and 3.

A 2.24% lactic acid solution was simultaneously metered by means of a conventional metering pump at a rate of 15.4 cc./min., to the lower inlet of the homogenizer.

The rotor of the homogenizer measured 4.5 in. in overall length, 2.5 in. in diameter and had a series of 0.062 in. high projections, 0.13 in. square, along the first 3.12 inches of its length. The stator had a smooth inner wall and the clearance between the uppermost planar surface of the projections and the inner surface of the stator was measured at 0.010 inch.

The rotor speed was maintained at about 290 r.p.m.

Alcohol at a temperature of −25° C. was circulated through the cooling jacket and served to maintain the collagen dispersion temperature at the oulet at 15° C.

The resultant mass was translucent and did not have the opacity associated with the usual non-uniformly swollen dispersions.

The swollen collagen blend was then extruded to form a tubular casing and the casing was stuffed with standard pork sausage emulsion and fried in a covered electric fry pan at 300° F. Three tablespoons of water were added to the cold pan and sausages placed therein. After five minutes, the cover was removed and the sausages turned until brown. During frying, the casings did not split, nor was meat exposed or extruded from the ends of the encased sausages. The casing conformed to the meat and resulted in a pleasing, attractive product. The casing did not impart a flavor to the sausage and was comestible with the meat.

EXAMPLE IV

To provide a control, the following operation was carried out in a homogenizer which was not equipped with a rotor or have a rotor-stator clearance in accordance with the apparatus of the present invention. The homogenizer was of the type generally shown in FIGS. 2 and 3 to the extent that it included; a swelling agent inlet, a collagen slurry inlet, a paddle type rotor, a stator, and an outlet for the mixed product. The rotor was of the type disclosed in U.S. Pat. 3,150,862, FIG. 4.

Ground, pretreated fibrillated collagen in the form of an aqueous slurry having a 6% solids content was maintained under a pressure of 60 p.s.i. in a pressurized vessel. The vessel was cooled by a 0° C. ice water bath.

The aqueous collagen slurry was pumped at a rate of about 77 to 88 cc./min. to the upper inlet of the homogenizer and a 0.5% perfluorobutyric acid solution was simultaneously metered at a rate of 14.8 to 19.0 cc./min., to the lower inlet of the homogenizer.

The resultant, viscous, swollen, collagen mixture contained portions of collagen that were highly swollen and portions that were substantially unswollen. Clumps of unswollen collagen fibers were matter together and encapsulated by a coating of viscous swollen collagen.

Further variations of the foregoing operation did not yield a mixture which could be considered to be a uniform composition. For example, a prolonged, slow mixing of the homogenizer failed to adequately redistribute the swelling agent or reduce the size or number of the readily deformable clumps while rapid mixing caused localized overheating and excessive degradation of the collagen.

EXAMPLE V

Pretreated, fibrillated collagen obtained by the procedure described in Example II above was diluted with water to a 7.8% solids content and acidified slightly to a 0.05% acid content with a lactic acid solution. The collagen slurry was then metered to the homogenizer of the present invention at a rate of 89 cc./min. and mixed therein with a dilute lactic acid solution metered to the homogenizer at a rate of 15.6 cc./min.

The rotor of the homogenizer was run at a speed of 180 r.p.m., and the alcohol coolant in the cooling jacket was maintained at a temperature of between about −15° C. and −20° C.

The resultant, swollen collagen dispersion was discharged from the homogenizer, at a temperature of 14° C. and had a 6.97% solids content.

Hand made tubular film fabricated from the swollen collagen exhibited a tensile strength of 79.3 lb./g. mass/in. of flat width. The tubular film was then stuffed with pork sausage and remained intact during subsequent frying of the encased pork sausage.

Although the invention has been described with particularity and in some detail, it should be understood that various changes, modifications and alterations can be made therein without departing from the spirit and scope of the invention.

What is claimed is:

1. A process for producing a formable collagen dispersion including the steps of:
    (a) forming an air-free collagen slurry;
    (b) simultaneously metering through separate conduits the collagen slurry and an air-free collagen swelling agent to an homogenizing mixing zone;
    (c) mixing together the metered proportions of collagen slurry and the collagen swelling agent in the homogenizing mixing zone the mixture in the form of a sheet-like mass being immediately subjected to shearing action;
    (d) continuing to subject the thin sheet-like mass of collagen slurry-swelling agent mixture to the shearing action until a uniform dispersion is obtained and the collagen is uniformly swollen; and
    (e) discharging the uniformly swollen collagen from the mixing zone.

2. The process of claim 1 wherein the collagen slurry delivered to the mixing zone has a solids content of from about 3–15% by weight.

3. The process of claim 1 wherein the collagen slurry delivered to the mixing zone has a solids content of from about 6% to 8% by weight.

4. The process of claim 1 wherein the temperature of the mixing zone during the mixing of the collagen slurry and the swelling agent does not exceed about 20° C.

5. The process of claim 1 wherein the collagen slurry-swelling agent mixture is maintained at a thickness of from about 0.005 to 0.015 of an inch during shearing.

6. A process for producing a formable collagen dispersion including the steps of:
    (a) forming an air-free aqueous collagen slurry having a solids content of from about 3%–15% by weight;
    (b) metering through a separate conduit the collagen slurry to an homogenizing mixing zone where the collagen slurry in the form of a sheet-like mass is subjected to shearing action;
    (c) simultaneously metering through a separate conduit an air-free collagen swelling agent to the homogenizing mixing zone and mixing together the sheet-like mass of collagen and the collagen swelling agent as the sheet-like mass of collagen is subjected to shearing action;
    (d) continuing to subject the collagen slurry-swelling agent mixture to the shearing action until a uniform dispersion in the form of a sheet-like mass having a thickness of from about 0.005 to 0.015 inch is obtained;
    (e) maintaining the mixing zone during the shearing at a temperature of from about 15° C. to 20° C.;
    (f) continuing the shearing of the collagen slurry-swelling agent mixture until the collagen is uniformly swollen; and
    (g) discharging the uniformly swollen collagen from the mixing zone.

7. The process of claim 6 wherein the collagen slurry delivered to the mixing zone has a solids content of from about 6%–8% by weight.

8. The process of claim 6 wherein the collagen slurry-swelling agent mixture has a thickness of about 0.010 of an inch.

References Cited

UNITED STATES PATENTS

| | | | |
|---|---|---|---|
| 2,115,484 | 4/1938 | Dewsbury et al. | 252—311 |
| 2,120,851 | 6/1938 | Becker et al. | 106—155 X |
| 2,919,998 | 1/1960 | Klevens et al. | 260—123.7 X |
| 3,303,038 | 2/1967 | Klevens | 106—155 |
| 3,433,864 | 3/1969 | Highberger et al. | 260—123.7 X |

RICHARD D. LOVERING, Primary Examiner

U.S. Cl. X.R.

99—176; 106—155; 252—314, 316, 359 D; 259—9; 260—123.7